United States Patent
Cabillic et al.

(10) Patent No.: US 8,078,842 B2
(45) Date of Patent: Dec. 13, 2011

(54) REMOVING LOCAL RAM SIZE LIMITATIONS WHEN EXECUTING SOFTWARE CODE

(75) Inventors: Gilbert Cabillic, Brece (FR); Gerard Chauvel, Antibes (FR); Jean-Philippe Lesot, Etrelles (FR)

(73) Assignee: Texas Instruments Incorporated, Dallas, TX (US)

( * ) Notice: Subject to any disclaimer, the term of this patent is extended or adjusted under 35 U.S.C. 154(b) by 1794 days.

(21) Appl. No.: 11/186,036

(22) Filed: Jul. 21, 2005

(65) Prior Publication Data
US 2006/0026412 A1    Feb. 2, 2006

(30) Foreign Application Priority Data
Jul. 27, 2004   (EP) .................................... 04291918

(51) Int. Cl.
*G06F 9/30*    (2006.01)
*G06F 9/40*    (2006.01)
*G06F 15/00*   (2006.01)

(52) U.S. Cl. ........................................ 712/211; 712/209
(58) Field of Classification Search ................... 712/226
See application file for complete search history.

(56) References Cited

U.S. PATENT DOCUMENTS

| | | | | |
|---|---|---|---|---|
| 6,009,261 A | * | 12/1999 | Scalzi et al. | 703/26 |
| 6,298,434 B1 | * | 10/2001 | Lindwer | 712/209 |
| 6,385,764 B1 | * | 5/2002 | Blandy et al. | 717/127 |
| 7,210,140 B2 | * | 4/2007 | Lindwer et al. | 717/158 |
| 2003/0061254 A1 | * | 3/2003 | Lindwer et al. | 709/1 |

* cited by examiner

*Primary Examiner* — Corey S Faherty
(74) *Attorney, Agent, or Firm* — Lawrence J. Bassuk; W. James Brady; Frederick J. Telecky, Jr.

(57) ABSTRACT

An electronic device that comprises a processor including an individual instruction and a first group of instructions. The device further comprises a memory externally coupled to the processor, as well as a second group of instructions. When executed, the first group of instructions causes the processor to execute the second group of instructions in lieu of the individual instruction.

16 Claims, 3 Drawing Sheets

| | |
|---|---|
| R0 | GENERAL PURPOSE (GP) |
| R1 | GENERAL PURPOSE (GP) |
| R2 | GENERAL PURPOSE (GP) |
| R3 | GENERAL PURPOSE (GP) |
| R4 | GENERAL PURPOSE (GP) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE (GP) |
| R9 | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

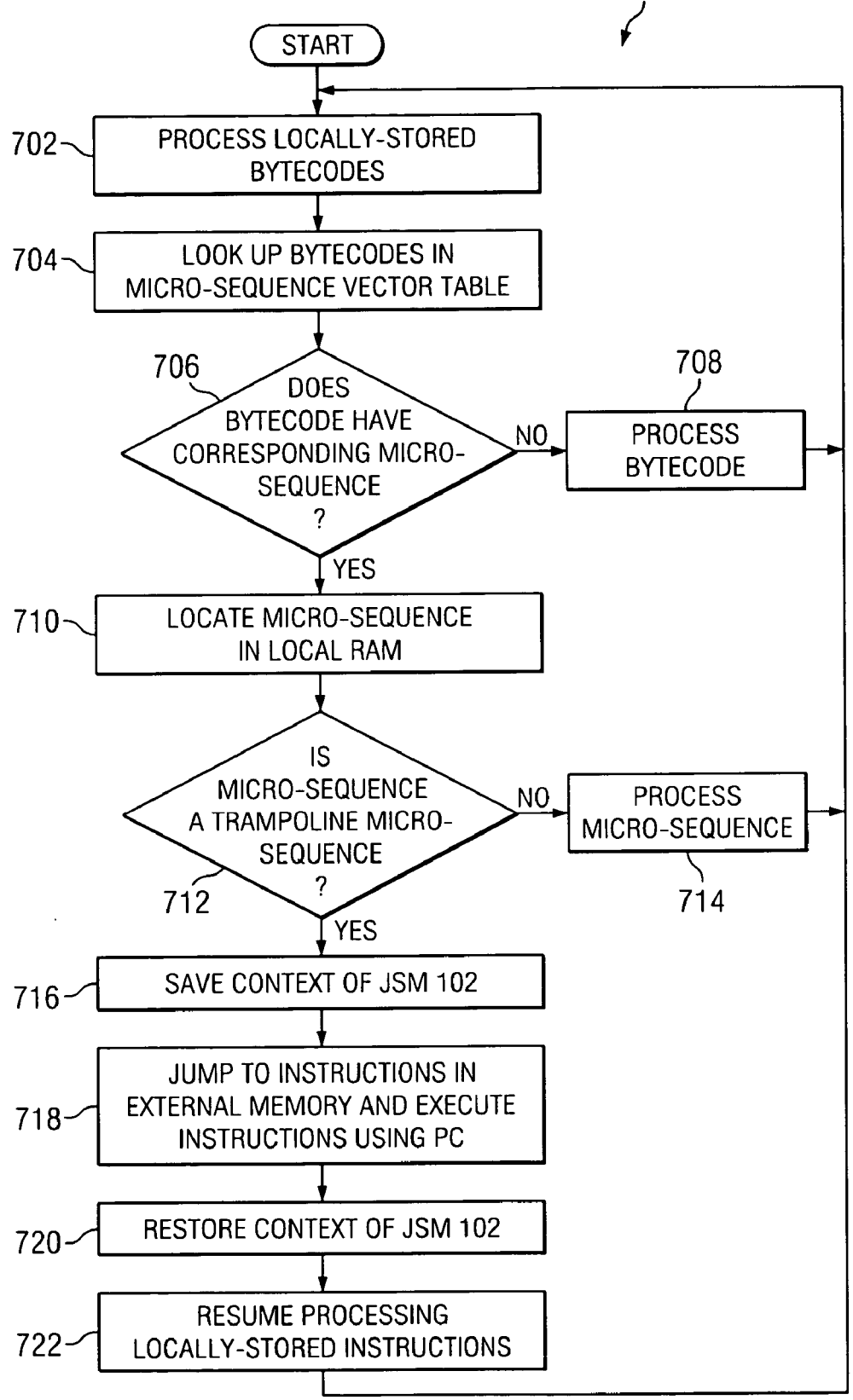

REMOVING LOCAL RAM SIZE LIMITATIONS WHEN EXECUTING SOFTWARE CODE

CROSS-REFERENCE TO RELATED APPLICATIONS

This application claims priority to European Patent Application No. 04291918.3, filed on Jul. 27, 2004 and incorporated herein by reference.

BACKGROUND

In systems with dual core processors, each processor core may be responsible for performing one or more tasks. For example, each processor core may be responsible for executing its own set of software instructions. These instructions often are stored in memories local to each processor core. For instance, one processor core might contain a memory (e.g., random access memory (RAM)) which, in turn, contains a set of instructions for the processor core to execute. In some cases, instructions may be too large and/or complex to be contained within such a memory. In other cases, the size of the memory may preclude it from containing more than a few instructions at a time. Such memory size limitations are undesirable.

BRIEF SUMMARY

Disclosed herein is a technique for processors to execute large and/or complex instructions located on memories external to the processors. An illustrative embodiment comprises an electronic device that comprises a processor including an individual instruction (e.g., a Java™ Bytecode) and a first group of instructions. The device further comprises a memory externally coupled to the processor, as well as a second group of instructions. When executed, the first group of instructions causes the processor to execute the second group of instructions in lieu of the individual instruction.

Another illustrative embodiment comprises a processor that comprises decode logic adapted to process an individual instruction and a first group of instructions. Execution of the first group causes the decode logic to push onto a stack data pertaining to a state of the processor. Execution of the first group causes the decode logic to process a second group of instructions, where the second group is processed in lieu of the individual instruction and stored in a memory external to the processor.

Yet another illustrative embodiment comprises a computer-readable storage medium storing instructions that, when executed by a processor, cause the processor to perform a method. The method comprises executing a plurality of individual instructions and pushing registers pertaining to a state of the processor onto a stack. The method further comprises, in lieu of executing an individual instruction stored on the medium, causing a group of instructions to be executed, said group of instructions on a memory external to the processor. The method also comprises resuming execution of the plurality of individual instructions by popping at least some of the registers off of the stack.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein:

FIG. 5 shows a flow diagram describing the implementation of the trampoline micro-sequence described herein, in accordance with a preferred embodiment of the invention.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

The processor described herein is particularly suited for executing Java™ Bytecodes or comparable code. As is well known, Java is particularly suited for embedded applications. Java is a stack-based language, meaning that a processor stack is heavily used when executing various instructions (e.g., Bytecodes), which instructions preferably have a size of 8 bits. Java is a relatively "dense" language meaning that on average each instruction may perform a large number of functions compared to other instructions. The dense nature of Java is of particular benefit for portable, battery-operated devices that preferably include as little memory as possible to save space and power. The reason, however, for executing Java code is not material to this disclosure or the claims which follow. Further, the processor advantageously includes one or more features that permit the execution of the Java code to be accelerated.

Figure 1:
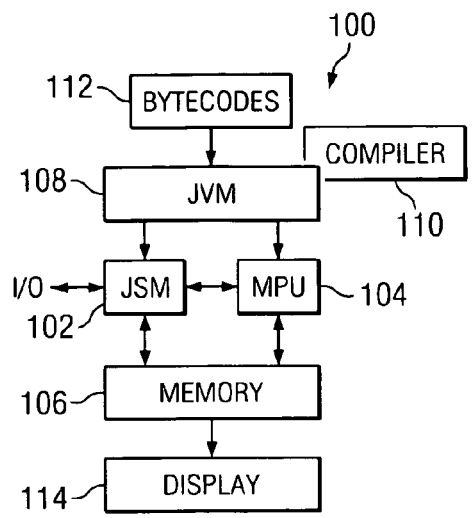
FIG. 1 shows a diagram of a system in accordance with preferred embodiments of the invention and including a Java Stack Machine ("JSM") and a Main Processor Unit ("MPU"), in accordance with embodiments of the invention.

Referring now to FIG. 1, a system 100 is shown in accordance with a preferred embodiment of the invention. As shown, the system includes at least two processors 102 and 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The MPU 104 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired for various applications.

As is generally well known, Java code comprises a plurality of "Bytecodes" 112. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java Bytecodes. When appropriate, however, the JSM 102 may request the MPU 104 to execute one or more Java Bytecodes not executed or executable by the JSM 102. In addition to executing Java Bytecodes, the MPU 104 also may execute non-Java instructions. The MPU 104 also hosts an operating system ("O/S") (not specifically shown) which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 generally comprises a combination of software and hardware. The software may include the compiler 110 and the hardware may include the JSM 102. The JVM may include a class loader, Bytecode verifier, garbage collector, and a Bytecode interpreter loop to interpret the Bytecodes that are not executed on the JSM processor 102.

In accordance with preferred embodiments of the invention, the JSM 102 may execute at least two types of instruction sets. One type of instruction set may comprise standard Java Bytecodes. As is well-known, Java is a stack-based programming language in which instructions generally target a stack. For example, an integer add ("IADD") Java instruction pops two integers off the top of the stack, adds them together, and pushes the sum back on the stack. A "simple" Bytecode instruction is generally one in which the JSM 102 may perform an immediate operation either in a single cycle (e.g., an "iadd" instruction) or in several cycles (e.g., "dup2_x2"). A "complex" Bytecode instruction is one in which several memory accesses may be required to be made within the JVM data structure for various verifications (e.g., NULL pointer, array boundaries). As will be described in further detail below, one or more of the complex Bytecodes may be replaced by a "micro-sequence" comprising various other instructions.

Another type of instruction set executed by the JSM 102 may include instructions other than standard Java instructions. In accordance with at least some embodiments of the invention, the other instruction set may include register-based and memory-based operations to be performed. This other type of instruction set generally complements the Java instruction set and, accordingly, may be referred to as a complementary instruction set architecture ("C-ISA"). By complementary, it is meant that a complex Java Bytecode may be replaced by a "micro-sequence" comprising C-ISA instructions. The execution of Java may be made more efficient and run faster by replacing some sequences of Bytecodes by preferably shorter and more efficient sequences of C-ISA instructions. The two sets of instructions may be used in a complementary fashion to obtain satisfactory code density and efficiency. As such, the JSM 102 generally comprises a stack-based architecture for efficient and accelerated execution of Java Bytecodes combined with a register-based architecture for executing register and memory based C-ISA instructions. Both architectures preferably are tightly combined and integrated through the C-ISA. Because various of the data structures described herein are generally JVM-dependent and thus may change from one JVM implementation to another, the software flexibility of the micro-sequence provides a mechanism for various JVM optimizations now known or later developed.

Figure 2:
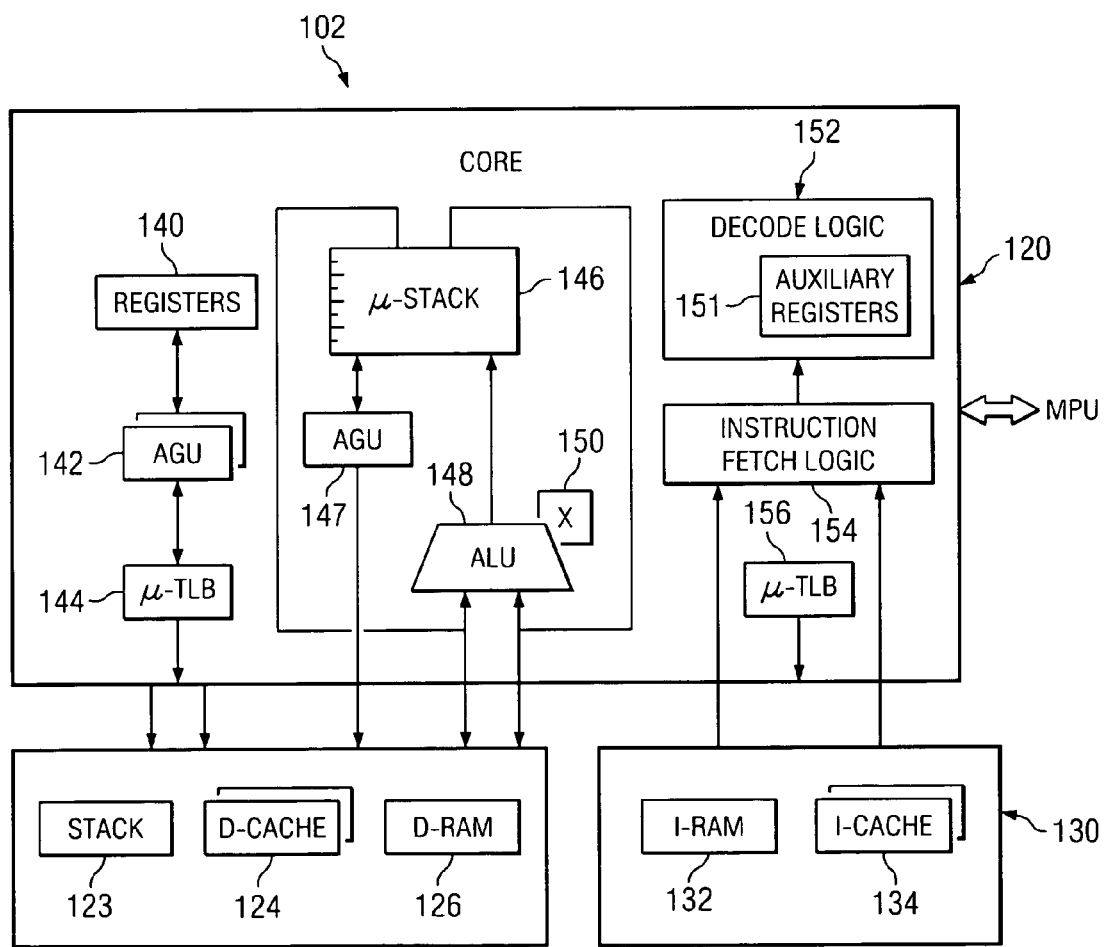
FIG. 2 shows a block diagram of the JSM of FIG. 1 in accordance with preferred embodiments of the invention.

FIG. 2 shows an exemplary block diagram of the JSM 102. As shown, the JSM includes a core 120 coupled to data storage 122 and instruction storage 130, where the instruction storage 130 is a computer-readable storage medium. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an arithmetic logic unit ("ALU") 148, a multiplier 150, decode logic 152, and instruction fetch logic 154. In general, operands may be retrieved from data storage 122 or from the micro-stack 146 and processed by the ALU 148, while instructions may be fetched from instruction storage 130 by fetch logic 154 and decoded by decode logic 152. The address generation unit 142 may be used to calculate addresses based, at least in part, on data contained in the registers 140. The AGUs 142 may calculate addresses for C-ISA instructions. The AGUs 142 may support parallel data accesses for C-ISA instructions that perform array or other types of processing. The AGU 147 couples to the micro-stack 146 and may manage overflow and underflow conditions in the micro-stack preferably in parallel. The micro-TLBs 144, 156 generally perform the function of a cache for the address translation and memory protection information bits that are preferably under the control of the operating system running on the MPU 104. The decode logic 152 comprises auxiliary registers 151.

Figures 3, 4:
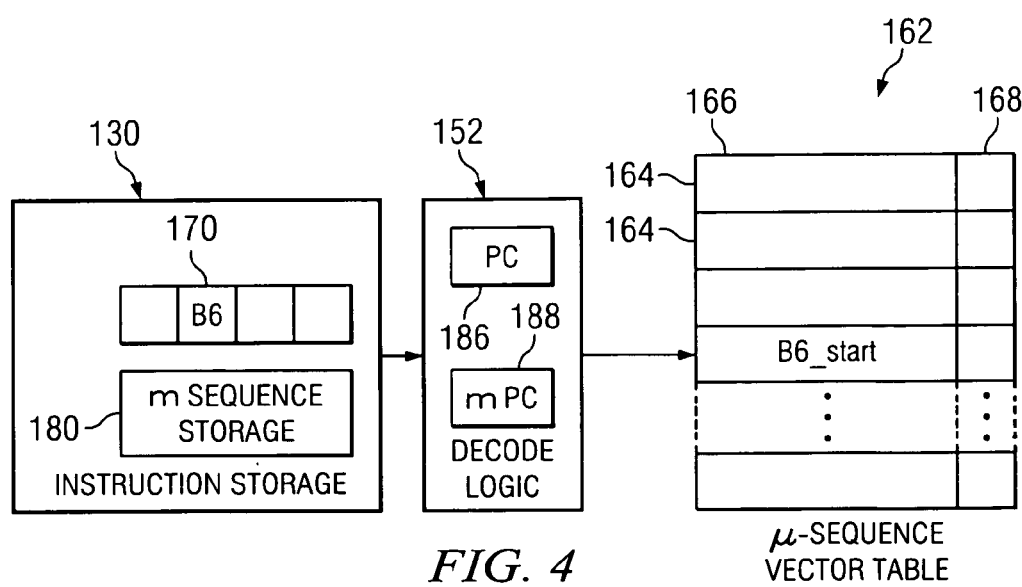
FIG. 3 shows various registers used in the JSM of FIGS. 1 and 2, in accordance with embodiments of the invention.
FIG. 4 shows the preferred operation of the JSM to include "micro-sequences," in accordance with embodiments of the invention.

Referring now to FIG. 3, the registers 140 may include 16 registers designated as R0-R15. In some embodiments, registers R0-R5 and R8-R14 may be used as general purposes ("GP") registers usable for any purpose by the programmer. Other registers, and some of the GP registers, may be used for specific functions. For example, in addition to use as a GP register, register R5 may be used to store the base address of a portion of memory in which Java local variables may be stored when used by the current Java method. The top of the micro-stack 146 can be referenced by the values in registers R6 and R7. The top of the micro-stack 146 has a matching address in external memory pointed to by register R6. The values contained in the micro-stack 146 are the latest updated values, while their corresponding values in external memory may or may not be up to date. Register R7 provides the data value stored at the top of the micro-stack 146. Register R15 may be used for status and control of the JSM 102. At least one bit (called the "Micro-Sequence-Active" bit) in status register R15 is used to indicate whether the JSM 102 is executing a simple instruction or a complex instruction through a micro-sequence. This bit controls, in particular, which program counter is used (PC or μPC) to fetch the next instruction, as will be explained below.

Referring again to FIG. 2, as noted above, the JSM 102 is adapted to process and execute instructions from at least two instruction sets, at least one having instructions from a stack-based instruction set (e.g., Java). The stack-based instruction set may include Java Bytecodes. Unless empty, Java Bytecodes may pop data from and push data onto the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The ALU 148 adds, subtracts, and shifts data. The multiplier 150 may be used to multiply two values together in one or more cycles. The instruction fetch logic 154 generally fetches instructions from instruction storage 130. The instructions may be decoded by decode logic 152. Because the JSM 102 is adapted to process instructions from at least two instruction sets, the decode logic 152 generally comprises at least two modes of operation, one mode for each instruction set. As such, the decode logic unit 152 may include a Java mode in which Java instructions may be decoded and a C-ISA mode in which C-ISA instructions may be decoded.

The data storage 122 generally comprises data cache ("D-cache") 124 and data random access memory ("DRAM") 126. Reference may be made to U.S. Pat. No. 6,826,652, filed Jun. 9, 2000 and U.S. Pat. No. 6,792,508, filed Jun. 9, 2000, both incorporated herein by reference. Reference also may be made to U.S. Ser. No. 09/932,794 (Publication No. 20020069332), filed Aug. 17, 2001 and incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for "complex" micro-sequenced Bytecodes or micro-sequences, as described below. The I-cache 134 may be used to store other types of Java Bytecode and mixed Java/C-ISA instructions.

As noted above, the C-ISA instructions generally complement the standard Java Bytecodes. For example, the compiler 110 may scan a series of Java Bytecodes 112 and replace a complex Bytecode with a micro-sequence as explained previously. The micro-sequence may be created to optimize the function(s) performed by the replaced complex Bytecodes.

FIG. 4 illustrates the operation of the JSM 102 to replace Java Bytecodes with micro-sequences. FIG. 4 shows some, but not necessarily all, components of the JSM. In particular, the instruction storage 130, the decode logic 152, and a micro-sequence vector table 162 are shown. The decode logic 152 receives instructions from the instruction storage 130 and accesses the micro-sequence vector table 162. In general and as described above, the decode logic 152 receives instructions (e.g., instructions 170) from instruction storage 130 via instruction fetch logic 154 (FIG. 2) and decodes the instructions to determine the type of instruction for subsequent processing and execution. In accordance with the preferred embodiments, the JSM 102 either executes the Bytecode from instructions 170 or replaces a Bytecode from instructions 170 with a micro-sequence as described below.

The micro-sequence vector table 162 may be implemented in the decode logic 152 or as separate logic in the JSM 102. The micro-sequence vector table 162 preferably includes a plurality of entries 164. The entries 164 may include one entry for each Bytecode that the JSM may receive. For example, if there are a total of 256 Bytecodes, the micro-sequence vector table 162 preferably comprises at least 256 entries. Each entry 164 preferably includes at least two fields—a field 166 and an associated field 168. Field 168 may comprise a single bit that indicates whether the instruction 170 is to be directly executed or whether the associated field 166 contains a reference to a micro-sequence. For example, a bit 168 having a value of "0" ("not set") may indicate the field 166 is invalid and thus, the corresponding Bytecode from instructions 170 is directly executable by the JSM. Bit 168 having a value of "1" ("set") may indicate that the associated field 166 contains a reference to a micro-sequence.

If the bit 168 indicates the associated field 166 includes a reference to a micro-sequence, the reference may comprise the full starting address in instruction storage 130 of the micro-sequence or a part of the starting address that can be concatenated with a base address that may be programmable in the JSM. In the former case, field 166 may provide as many address bits as are required to access the full memory space. In the latter case, a register within the JSM registers 140 is programmed to hold the base address and the vector table 162 may supply only the offset to access the start of the micro-sequence. Most or all JSM internal registers 140 and any other registers preferably are accessible by the main processor unit 104 and, therefore, may be modified by the JVM as necessary. Although not required, this latter addressing technique may be preferred to reduce the number of bits needed within field 166. At least a portion 180 of the instruction 130 may be allocated for storage of micro-sequences and thus the starting address may point to a location in micro-sequence storage 130 at which a particular micro-sequence can be found. The portion 180 may be implemented in I-RAM 132 shown above in FIG. 2.

Although the micro-sequence vector table 162 may be loaded and modified in accordance with a variety of techniques, the following discussion includes a preferred technique. The vector table 162 preferably comprises a JSM resource that is addressable via a register 140. A single entry 164 or a block of entries within the vector table 162 may be loaded by information from the data cache 124 (FIG. 2). When loading multiple entries (e.g., all of the entries 164) in the table 162, a repeat loop of instructions may be executed. Prior to executing the repeat loop, a register (e.g., R0) preferably is loaded with the starting address of the block of memory containing the data to load into the table. Another register (e.g., R1) preferably is loaded with the size of the block to load into the table. Register R14 is loaded with the value that corresponds to the first entry in the vector table that is to be updated/loaded.

The repeated instruction loop preferably comprises two instructions that are repeated n times. The value n preferably is the value stored in register R1. The first instruction in the loop preferably performs a load from the start address of the block (R0) to the first entry in the vector table 162. The second instruction in the loop preferably adds an "immediate" value to the block start address. The immediate value may be "2" if each entry in the vector table is 16 bits wide. The loop repeats itself to load the desired portions of the total depending on the starting address.

In operation, the decode logic 152 uses a Bytecode from instructions 170 as an index into micro-sequence vector table 162. Once the decode logic 152 locates the indexed entry 164, the decode logic 152 examines the associated bit 168 to determine whether the Bytecode is to be replaced by a micro-sequence. If the bit 168 indicates that the Bytecode can be directly processed and executed by the JSM, then the instruction is so executed. If, however, the bit 168 indicates that the Bytecode is to be replaced by a micro-sequence, then the decode logic 152 preferably changes this instruction into a "no operation" (NOP) and sets the micro-sequence-active bit (described above) in the status register R15. In another embodiment, the JSM's pipe may be stalled to fetch and replace this micro-sequenced instruction by the first instruction of the micro-sequence. Changing the micro-sequenced Bytecode into a NOP while fetching the first instruction of the micro-sequence permits the JSM to process multi-cycle instructions that are further advanced in the pipe without additional latency. The micro-sequence-active bit may be set at any suitable time such as when the micro-sequence enters the JSM execution stage (not specifically shown).

As described above, the JSM 102 implements two program counters the PC and the µPC. The PC and the µPC are stored in auxiliary registers 151, which in turn is stored in the decode logic 152. In accordance with a preferred embodiment, one of these two program counters is the active program counter used to fetch and decode instructions. The PC 186 may be the currently active program counter when the decode logic 152 encounters a Bytecode to be replaced by a micro-sequence. Setting the status register's micro-sequence-active bit causes the micro-program counter 188 to become the active program counter instead of the program counter 186. Also, the contents of the field 166 associated with the micro-sequenced Bytecode preferably are loaded into the µPC 188. At this point, the JSM 102 is ready to begin fetching and decoding the instructions comprising the micro-sequence. At or about the time the decode logic begins using the µPC 188, the PC 186 preferably is incremented by a suitable value to point the PC to the next instruction following the Bytecode that is replaced by the micro-sequence. In at least some embodiments, the micro-sequence-active bit within the status register R15 may only be changed when the first instruction of the micro-sequence enters the execute phase of JSM 102 pipe. The switch from PC 186 to the µPC 188 preferably is effective immediately after the micro-sequenced instruction is decoded, thereby reducing the latency.

The micro-sequence may end with a predetermined value or Bytecode from the C-ISA called "RtuS" (return from micro-sequence) that indicates the end of the sequence. This C-ISA instruction causes a switch from the µPC to the PC upon completion of the micro-sequence. Preferably, the PC 186 previously was incremented, as discussed above, so that the value of the PC 186 points to the next instruction to be decoded. The instruction may have a delayed effect or an immediate effect depending on the embodiment that is implemented. In embodiments with an immediate effect, the switch from the µPC to the PC is performed immediately after the instruction is decoded and the instruction after the RtuS instruction is the instruction pointed to by the address present in the PC 186.

As discussed above, one or more Bytecodes may be replaced with a micro-sequence or a group of other instructions. Such replacement instructions may comprise any suitable instructions for the particular application and situation at hand. At least some such suitable instructions are disclosed in U.S. Ser. No. 10/631,308 (Publication No. 20040024989), filed Jul. 31, 2003 and incorporated herein by reference.

In cases where local memory, such as the I-RAM 132, has a size that precludes it from handling large and/or complex instructions (e.g., some or all micro-sequences cannot fit in the local memory), a micro-sequence instruction may be used to execute the large and/or complex instructions in a memory external to the JSM 102. Specifically, while the JSM 102 executes instructions (e.g., Bytecodes), the JSM 102 may encounter a Bytecode that corresponds to a micro-sequence on the micro-sequence vector table 162. One such micro-sequence may be a "trampoline" micro-sequence. The trampoline micro-sequence is the micro-sequence that is used to execute large and/or complex instructions in a memory external to the JSM 102. The trampoline micro-sequence also may be used to execute instructions in the external memory in cases where local memory (e.g., I-RAM 132) cannot accept additional instructions due to size limitations. The trampoline micro-sequence preferably is executed using the µPC 188.

When executed by the JSM 102, the trampoline micro-sequence causes a series of events to occur. First, execution of the trampoline micro-sequence causes the JSM 102 to store the context of the Bytecodes being executed in the JSM 102. A context is stored in preparation for execution of instructions from the memory external to the JSM 102, mentioned above. Specifically, once the instructions on the external memory have been executed, the context information is used by the JSM 102 to resume execution of instructions from local memory. In at least some embodiments, storing a context comprises storing a minimal amount of information pertaining to a state of the JSM 102 onto a stack, such as stack 123 of FIG. 2. A "minimal" amount of information generally comprises information in one or more registers, but not all registers, of the JSM 102. For example, in some embodiments, a "minimal" amount of information comprises the PC 186, the µPC 188 and the status register R15. In other embodiments, a "minimal" amount of information comprises the PC 186, the µPC 188 and the status register R15, as well as one or more additional registers, but less than all registers. In still other embodiments, a "minimal" amount of information comprises less than all registers. In yet other embodiments, a "minimal" amount of information consists of only the information (i.e., registers) used by the externally-located instructions. In such cases, the "minimal" amount of information may simply be one register or may be all of the registers in the processor core. In some situations, more than a minimal amount of information may be stored.

Next, upon storing the context of the currently-executing instructions, the trampoline micro-sequence causes the JSM 102 to begin executing instructions stored on a memory external to the JSM 102. For example, in some embodiments, the trampoline micro-sequence may cause the JSM 102 to begin executing instructions stored on the memory 106. Whereas the trampoline micro-sequence is executed by the JSM 102 using the µPC 188, the JSM 102 executes the instructions stored on the external memory using the PC 186. The instructions stored on the external memory preferably are executed by the JSM 102 without incurring a thread switch, although the scope of disclosure is not limited as such. The JSM 102 continues to execute the instructions on the external memory until some or all of the instructions have been executed. These externally-stored instructions cause the JSM 102 to perform a particular function (or, in some cases, more than one function). The particular function preferably is the same as the function that the Bytecode corresponding to the trampoline micro-sequence can cause the JSM 102 to perform. The scope of disclosure is not limited as such and, in other embodiments, the particular function may be different from the function that the Bytecode corresponding to the trampoline micro-sequence can cause the JSM 102 to perform.

Finally, after the instructions on the external memory have been processed, the JSM 102 resumes executing the instructions stored in local memory. However, because the trampoline micro-sequence made use of the μPC 188, and further because the instructions on the external memory made use of the PC 186, it is necessary for the JSM 102 to load the original context (i.e., the context stored on the stack 123 or other suitable location) prior to resuming execution of locally-stored instructions. By loading the original context to the JSM 102 prior to resuming execution of the locally-stored instructions, the JSM 102 sets the PC 186 to the PC value prior to execution of the trampoline micro-sequence and the externally-stored instructions. Similarly, by loading the original context, the JSM 102 sets the μPC 188 and the status register R15 to the μPC and status register R15 values prior to execution of the trampoline micro-sequence and the externally-stored instructions. The scope of disclosure is not limited to storing the PC 186, μPC 188 and the status register R15.

In embodiments where the context values have been pushed onto the stack 123, the JSM 102 pops the context values off of the stack 123 and stores the context values to their respective locations. For instance, the JSM 102 pops the original PC 186 value off of the stack 123 and stores the original PC 186 value to the PC 186. Similarly, the JSM 102 pops the original μPC 188 values off of the stack 123 and stores the original μPC 188 value to the μPC 188. Likewise, the JSM 102 pops the original status register R15 off of the stack 123 and stores the original status register R15 to the register R15. The JSM 102 also may pop any other suitable context values off of the stack 123 (or other storage location) and store these context values to their respective locations in the JSM 102.

Once the JSM 102 has restored the context, the JSM 102 may resume executing locally-stored instructions. In some embodiments, after restoring the context, control may return to the trampoline micro-sequence, which preferably ends immediately and passes control to a Bytecode following the Bytecode to which the trampoline micro-sequence corresponds. In other embodiments, control may be passed directly to the Bytecode following the Bytecode to which the trampoline micro-sequence corresponds.

FIG. 5 shows a flowchart of a process 700 that may be used to implement the technique described above. The process 700 may begin by processing locally-stored Bytecodes (block 702). The Bytecodes may be stored, for example, in the instruction storage module 130. As each instruction (e.g., Bytecode) is processed, the JSM 102 refers to the micro-sequence vector table 162 to determine whether the Bytecode has a corresponding micro-sequence (block 704). Specifically, in block 706, the JSM 102 refers to bit 168 of an entry 164 that corresponds to the Bytecode in order to determine whether the bit is set (indicating that the Bytecode has a corresponding micro-sequence) or not set (indicating that the Bytecode does not have a corresponding micro-sequence). In case the Bytecode does not having a corresponding micro-sequence, the JSM 102 processes the Bytecode (block 708) and resumes processing the locally-stored instructions (block 702). However, in case the Bytecode does have a corresponding micro-sequence, the JSM 102 uses the vector field 166 to locate the micro-sequence in the I-RAM 132 (block 710).

Process 700 continues based upon whether the micro-sequence in the I-RAM 132 is a trampoline micro-sequence or a replacement micro-sequence that performs substantially the same function as the Bytecode it replaces (block 712). In case the micro-sequence in the I-RAM 132 is a replacement micro-sequence that performs substantially the same function as the Bytecode it replaces, the JSM 102 processes the micro-sequence (block 714) and then continues processing the locally-stored instructions (block 702). However, if the micro-sequence in the I-RAM 132 is a trampoline micro-sequence, then the process 700 comprises executing the trampoline micro-sequence using the μPC 188. Executing the trampoline micro-sequence causes the JSM 102 to save the context of the JSM 102 (block 716) and to jump to external memory 106 so that the JSM 102 may execute the instructions stored in the external memory 106 (block 718). The JSM 102 saves its context by, for instance, pushing the PC 186, the μPC 188, the status register R15 and/or any other suitable values onto the stack 123. These externally-stored instructions may perform substantially the same function as the Bytecode replaced by the trampoline micro-sequence. The JSM 102 uses the PC 186 when executing these externally-stored instructions. After executing the externally-stored instructions, the JSM 102 restores its context by popping the context values (e.g., the PC 186, the μPC 188, the status register R15) off of the stack 123 and storing these context values to their respective locations in the JSM 102 (block 720). Finally, the JSM 102 resumes executing the locally-stored instructions (block 722).

Figure 6:
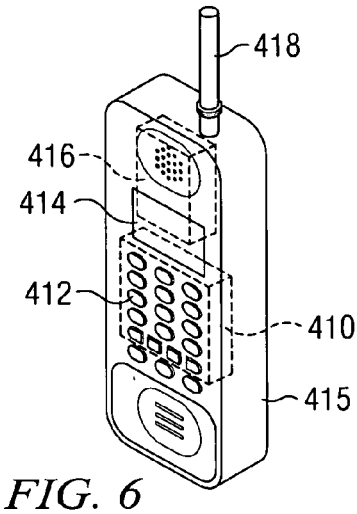
FIG. 6 shows the system described herein, in accordance with preferred embodiments of the invention.

System 100 may be implemented as a mobile cell phone 415 such as that shown in FIG. 6. As shown, the battery-operated, mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. An electronic device, comprising:
 a processor configured to directly execute at least some bytecodes in an instruction set of the processor, the processor comprising:
  decode logic;
  a vector table comprising a plurality of entries, wherein each entry of the plurality of entries corresponds to a bytecode in the instruction set and each entry comprises:
   a first field for indicating whether a micro-sequence is to be executed instead of the corresponding bytecode; and
   a second field for storing a reference to the micro-sequence; and
  an instruction memory configured to store micro-sequences referenced by the entries in the vector table; and
 a memory externally coupled to the processor, wherein the memory is configured to store a group of instructions that is to be executed instead of a bytecode, wherein the decode logic is configured to:
use a bytecode to locate an entry of the vector table corresponding to the bytecode; and
cause a micro-sequence referenced in the second field of the entry to be executed when the first field of the entry indicates that a micro-sequence is to be executed instead of the bytecode,
wherein, when executed, the micro-sequence causes the processor to execute the group of instructions.

2. The electronic device of claim 1, wherein, when executed, the group of instructions performs a function of the bytecode.

3. The electronic device of claim 1, wherein execution of the micro-sequence causes the processor to push onto a stack information pertaining to a state of the processor.

4. The electronic device of claim 3, wherein the information pertaining to the state of the processor comprises only a minimum amount of information needed to resume execution of one of the micro-sequence and a bytecode following the bytecode.

5. The electronic device of claim 3, wherein the processor, after executing the group of instructions and prior to resuming execution of one of the micro-sequence and a bytecode following the bytecode, pops the information off the stack and stores at least some of the information to registers in the processor.

6. The electronic device of claim 1, wherein the electronic device is at least one of a wireless communication device or a battery-operated device.

7. The electronic device of claim 1, wherein the processor uses a same program counter when executing the bytecode, a bytecode following the bytecode, and the group of instructions and another program counter when executing the micro-sequence.

8. A processor configured to directly execute at least some bytecodes in an instruction set of the processor, the processor comprising:
decode logic;
a vector table comprising a plurality of entries, wherein each entry of the plurality of entries corresponds to a bytecode in the instruction set and each entry comprises:
a first field for indicating whether a micro-sequence is to be executed instead of the corresponding bytecode; and
a second field for storing a reference to the micro-sequence; and
an instruction memory configured to store micro-sequences referenced by the entries in the vector table,
wherein the decode logic is configured to:
use a bytecode to locate an entry of the vector table corresponding to the bytecode; and
cause a micro-sequence referenced in the second field of the entry to be executed when the first field of the entry indicates that a micro-sequence is to be executed instead of the bytecode,
wherein, when executed, the micro-sequence causes the processor to execute a group of instructions stored in a memory external to the processor, and
wherein execution of the micro-sequence causes the decode logic to push onto a stack data pertaining to a state of the processor.

9. The processor of claim 8, wherein, when executed, the group of instructions performs a function of the bytecode.

10. The processor of claim 8, wherein, prior to a bytecode following the bytecode, the decode logic pops the data off the stack and stores at least some of the data to registers in the processor.

11. The processor of claim 8, wherein the data consists of two program counters and a status of the processor.

12. The processor of claim 8, wherein the data comprises only a minimum amount of information needed to resume execution of one of the micro-sequence and a bytecode following the bytecode.

13. The processor of claim 12, wherein said minimum amount of information comprises only contents of three registers.

14. A method comprising:
using a bytecode to locate an entry corresponding to the bytecode in a vector table, wherein the vector table comprises an entry for each bytecode in an instruction set of a processor;
causing a micro-sequence referenced in a second field of the entry to be executed when a first field in the entry indicates that the micro-sequence is to be executed by the processor instead of executing the bytecode,
wherein the micro-sequence is stored in an instruction memory comprised in the processor,
wherein, when executed, the micro-sequence causes the processor to execute a group of instructions stored in a memory external to the processor, and
wherein execution of the micro-sequence causes registers pertaining to a state of the processor to be pushed onto a stack before the group of instructions is executed.

15. The method of claim 14, wherein the registers comprise two program counters and a status of the processor.

16. The method of claim 14, wherein, when executed, the group of instructions performs a function of the bytecode.

* * * * *